(No Model.)

J. L. MAULDIN.
TROLLEY BASE.

No. 511,634. Patented Dec. 26, 1893.

Witnesses,
C. A. Amy.
Frank J. Lewis

Inventor,
James L. Mauldin.
By Attorney, Geo. W. Tibbitts.

THE NATIONAL LITHOGRAPHING COMPANY,
WASHINGTON, D. C.

UNITED STATES PATENT OFFICE.

JAMES L. MAULDIN, OF CLEVELAND, OHIO, ASSIGNOR OF ONE-HALF TO FRANK J. LEWIS, OF SAME PLACE.

TROLLEY-BASE.

SPECIFICATION forming part of Letters Patent No. 511,634, dated December 26, 1893.

Application filed March 20, 1893. Serial No. 466,778. (No model.)

*To all whom it may concern:*

Be it known that I, JAMES L. MAULDIN, a citizen of the United States, residing at Cleveland, in the county of Cuyahoga and State of Ohio, have invented certain new and useful Improvements in Trolley-Bases, of which the following is a specification.

This invention relates to electric trolleys for street railway motor-cars and has for its object to provide a base for the trolley poles, which shall enable the trolley wheel to readily adapt itself to the direction of the course or angle of the trolley wire, by the ability of the pole to bend or tilt to any angle from the perpendicular line.

Figure 2:
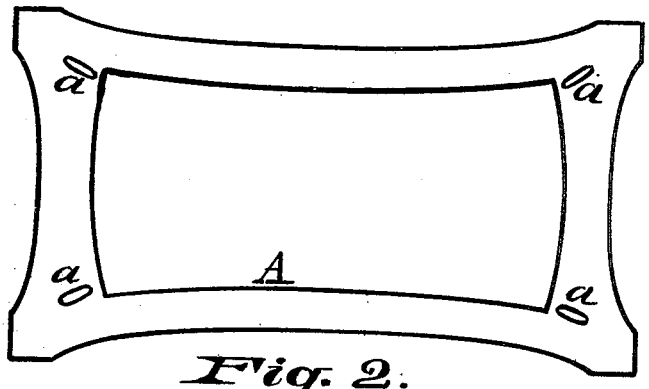
Figure 3:
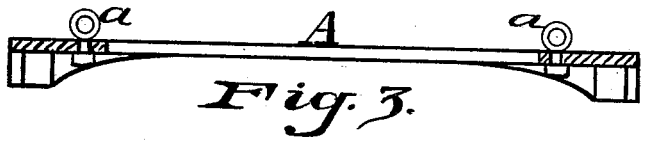
Figure 4:
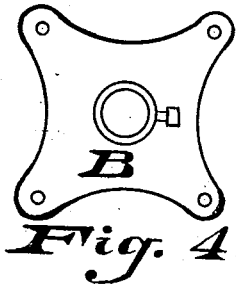
Figure 5:
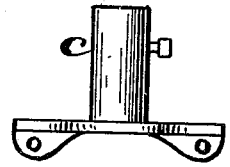
Figure 1:
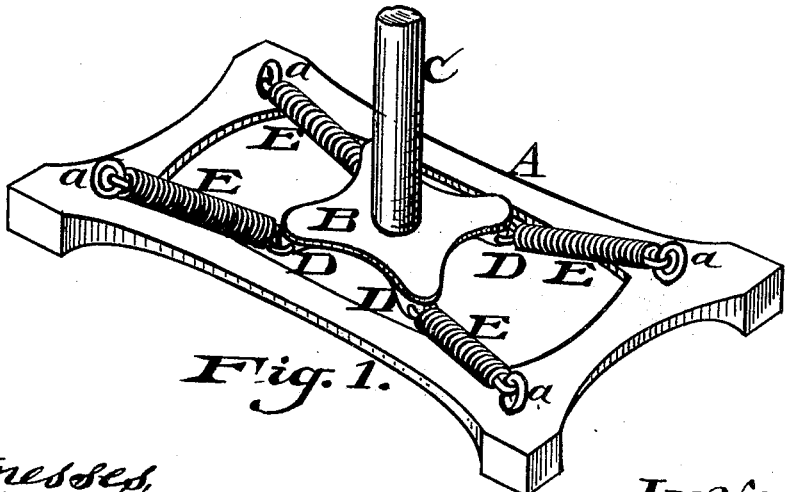

In the accompanying drawings Figure 1 is a perspective view of my new trolley base. Fig. 2 is a detached plan view of the base frame. Fig. 3 is a longitudinal section of the same. Fig. 4 is a top view of the pole base iron. Fig. 5 is a side elevation of the same.

A represents a base frame made preferably of iron, provided at the corners with eye bolts $a, a$. This frame may be attached to the roof of the car in any suitable manner.

B is a base iron for the trolley pole C, having a stud pin or socket $c$, for attaching trolley pole, which may be of wood or metal. Through the corners of said base iron, or through lugs or ribs on the other side, are made holes for the reception of rings $d, d$.

E E are strong spiral springs attached to the said rings $d, d$, and to the said eye bolts $a, a$. These springs form supports for the trolley pole, and by their tension tend to keep the trolley pole in a perpendicular position, but yield to the pressure when the pole is tilted in any direction, and readily adapt the position of the trolley wheel to the angle or curvature of the trolley wire, so that the trolley wheel is not liable to run off the wire.

Having described my invention, I claim—

The trolley base consisting of base frame A, having eye bolts $a$, the base iron B, rings D, end springs E, constructed and combined to operate substantially as and for the purpose set forth.

JAMES L. MAULDIN.

Witnesses:
GEO. W. TIBBITTS,
M. G. NORTON.